United States Patent [19]
Olsen et al.

[11] 3,940,768
[45] Feb. 24, 1976

[54] PRECISE PULSE REPETITION FREQUENCY MEASURING DEVICE AND SIGNAL SORTER

[75] Inventors: Robert C. Olsen; Frederick O. Stahlhut, both of Indianapolis, Ind.

[73] Assignee: The United States of America as represented by the Secretary of the Navy, Washington, D.C.

[22] Filed: Jan. 7, 1969

[21] Appl. No.: 791,537

[52] U.S. Cl. ........................ 343/18 E; 343/17.2 R
[51] Int. Cl.² .......................................... G01S 7/36
[58] Field of Search ............................ 343/18, 17.2

[56] References Cited
UNITED STATES PATENTS

| | | | |
|---|---|---|---|
| 3,021,523 | 2/1962 | Davis et al. ...................... | 343/18 E |
| 3,105,192 | 9/1963 | Messin et al. ..................... | 343/17.2 R X |
| 3,117,317 | 1/1964 | Kenyon .......................... | 343/17.2 R X |
| 3,321,759 | 5/1967 | Freedman ........................ | 343/17.2 R |

*Primary Examiner*—Malcolm F. Hubler
*Attorney, Agent, or Firm*—R. S. Sciascia; Paul S. Collignon

[57] ABSTRACT

An electronic signal processing device comprised of timing and coincident gating means for utilization between one or more conventional radar receivers and a conventional visual display, multi-gun pulse analyzer to enable an electronic intelligence operator to perform precise real time measurement of the pulse repetition interval (PRI) and its counterpart, pulse repetition frequency (PRF), for any one of a group of radar signals in a multi-signal environment. The device provides an automatic gating loop for separating the received radar video signals into various known preset PRI-PRF bands, an electronic chopping circuit for enabling the device to produce an interleaved, panoramic display of all of the radar video signals within any one of the preset bands on a visual display pulse analyzer, various single-shot multivibrator and gating means for producing necessary synchronizing pulses, and a variable delay unit and pulse generator for selecting a single video signal from the panoramic display for closer examination on an expanded scale of the multi-gun analyzer and for producing a marking pulse which may be positioned by the operator to obtain an indication of the PRI and PRF of the selected signal from a calibrated dial of the variable delay unit.

5 Claims, 4 Drawing Figures

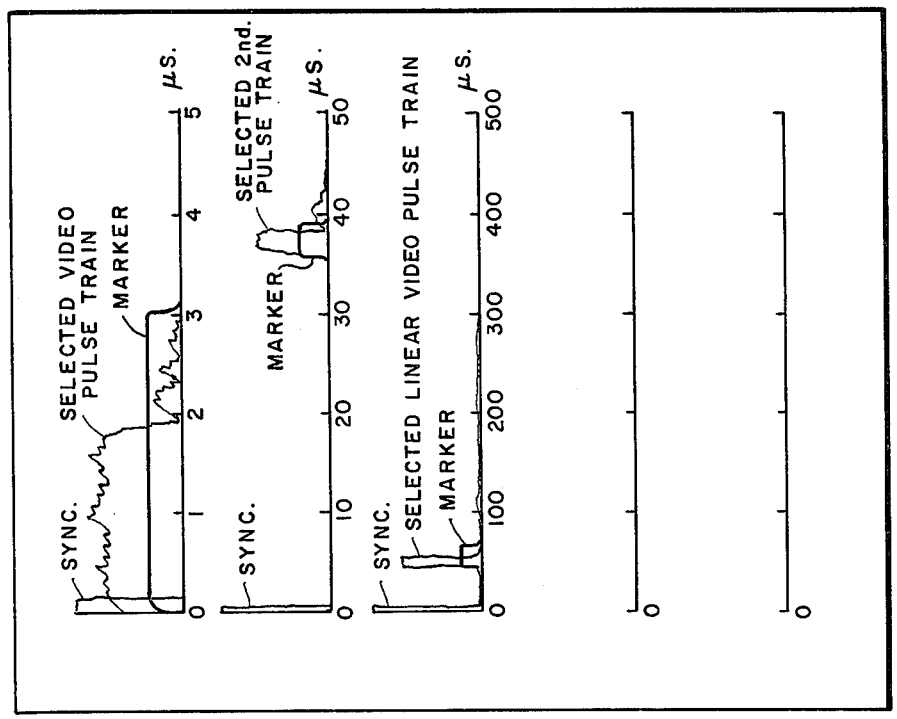
FIG. 3. SELECT MODE
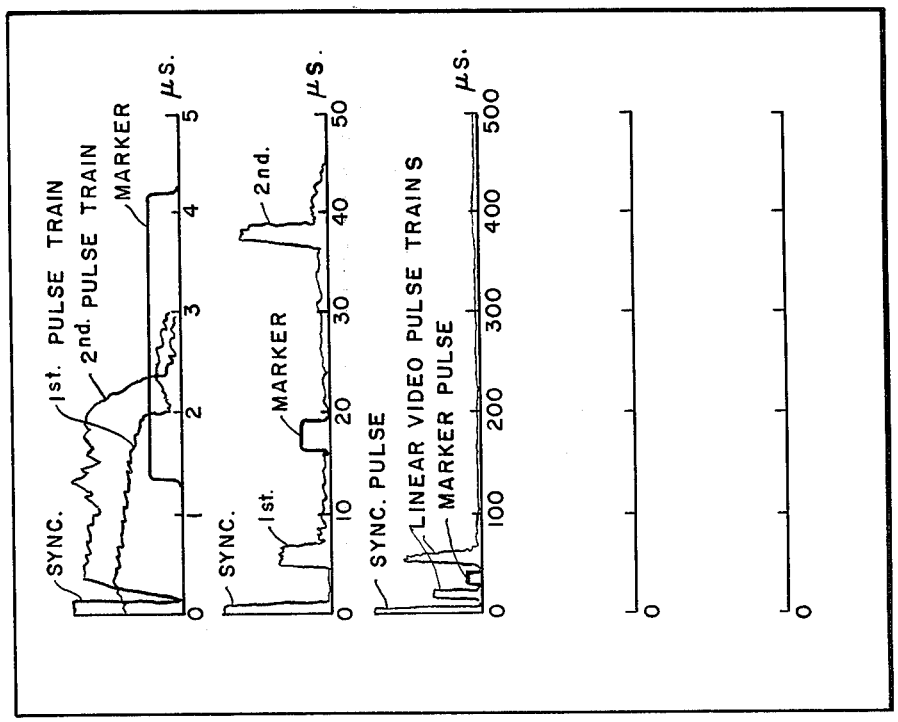
FIG. 2. PANORAMIC MODE
INVENTORS
ROBERT C. OLSEN
FREDERICK O. STAHLHUT
BY *H. H. Losche*
ATTORNEY

INVENTORS
ROBERT C. OLSEN
FREDERICK O. STAHLHUT

3,940,768

PRECISE PULSE REPETITION FREQUENCY MEASURING DEVICE AND SIGNAL SORTER

Statement of Government Interest

The invention described herein may be manufactured and used by or for the Government of the United States of America for governmental purposes without the payment of any royalties thereon or therefor.

Background of the Invention

This invention is in the field of radio wave communications, and more specifically in the area of passive radar countermeasures and electronic intelligence gathering systems for determining the pulse repetition interval and pulse repetition frequency of any one of a group of radar signals in a multi-signal environment.

Those engaged in military electronic intelligence gathering have indicated a critical need for signal processing equipment to enable them to obtain useful information from intercepted signals originating from unknown emitters in complex electromagnetic environments. These intercepted signals have individual characteristics or "signatures" which may be utilized for signal identification and sorting purposes. These characteristics include the emitter radio frequency, pulse width, and pulse repetition interval (PRI) with its inverse function, pulse repetition frequency (PRF). In prior art intelligence gathering devices, sorting by radio frequency has received the major emphasis. However, today many different types of emitters utilize the same radio frequency bands, requiring signal identification to be based upon one or more of the other signal characteristics. Of these other characteristics, PRI, and its inherent PRF, has been found to be the most useful sorting parameter. Most of the prior art means for measuring this parameter has been comprised of some form of analog scale device with rather low accuracy, usually no closer than plus or minus five percent of the true PRF value. Even this accuracy is usually not attainable with prior art devices when operating in a complex (multi-signal) environment.

The present invention satisfies this need for signal processing equipment by providing a device for utilization between a conventional radar receiver and visual pulse analyzer for enabling an electronic intelligence gathering operator to separate selected signals in a multi-signal environment for closer examination, and to measure the pulse repetition interval and frequency of each of these selected signals.

Summary of The Invention

The present invention provides a signal processing device comprised of electronic timing and coincident gating means, for utilization with conventional radar receivers and a multi-gun visual pulse analyzer, to perform precise real time measurement of the pulse repetition interval and pulse repetition frequency of radar signals in a multi-signal environment.

The invention is comprised of an automatic gating loop for separating the received pulse radar video signals into discrete steps or bands of pulse repetition intervals (PRIs), an electronic chopping circuit coupled to the automatic gating loop for enabling the device to produce a panoramic PRF display of all of the radar video signals within any one of the preset bands on a visual display means, various video gating means, and an adjustable linear delay unit coupled to a marker pulse generating unit and having a dial calibrated in microseconds for indicating the amount of time delay to be introduced prior to the production of a marker pulse, through the manual positioning of the dial by an operator.

The invention accepts pulse radar signals from a radar receiver covering a desired radio frequency spectrum and employs an adjustable, crystal controlled oscillator and flip-flop countdown binary divider circuit within the automatic gating loop to cause these signals to be gated or separated into discrete bands depending upon the time between pulses in a video pulse train, or PRI. All of the received radar signals having a PRI within the band which has been selected by adjustment of the crystal controlled oscillator are gated on a time shared basis to a summing amplifier and combined with a synchronizing signal. This combined video and sync signal is coupled to the input of a visual display pulse analyzer means having a multi-gun display tube capable of producing a first trace in one period of time, for example, 50 microseconds ($\mu$s), and a second, expanded trace in a much shorter period of time, such as 5 $\mu$s. A marker pulse produced by the marker pulse generating unit is coupled via the summing amplifier to the visual display means. With the invention in its "panoramic mode" of operation, all pulse video signals received from the radar receiver which have a PRI within the band selected by adjustment of the crystal oscillator-countdown divider unit will be displayed on the longer period trace (50 $\mu$s) of the pulse analyzer in relative position with respect to one another in accordance with the particular PRI of each of the signals. The marker pulse produced by the one-shot marker pulse generating unit also appears on the pulse analyzer screen, and by adjusting the calibrated dial of the variable linear delay unit, the leading edge of the marker pulse may be moved backward or forward across the analyzer screen and placed in coincidence with the leading edge of any one of the unknown radar signals. An indication of the PRI $$\left(\text{and } PRF, \text{ since } PRF \text{ in pulses per second} = \frac{1 \times 10^6}{PRI \text{ in } \mu \text{ seconds}}\right)$$

of any of the displayed signals can then be obtained by observing the dial reading of the variable linear delay unit after placing the leading edge of the marker pulse in coincidence with the leading edge of the pulse whose PRI and PRF are to be determined. The dial reading in microseconds is added by the operator to a fixed value in microseconds determined by the selected band of operation of the crystal oscillator, in order to obtain the PRI in microseconds of the chosen unknown signal. The PRF of the unknown signal may then be determined from the relationship of PRI to PRF.

When the invention is switched to its "select mode" of operation, the marker pulse also serves as a gating pulse and only a pulse with which it is set to coincide is gated to the pulse analyzer and reproduced on the fast trace, or expanded scale, for closer examination by the operator.

Brief Description of the Drawing

The objects and attendant advantages, features, and uses of the invention will become apparent from the following detailed description when considered in conjunction with the accompanying figures of drawing wherein:

FIG. 2 depicts the cathode ray tube (CRT) face plate of a conventional multi-gun visual pulse analyzer suitable for use with the invention, and the various video, marker, and sync waveforms provided by the invention as they might appear with the invention operating in its panoramic mode;

FIG. 3 shows the face of the pulse analyzer as it might appear with the invention operating in the select mode including the marker, selected video, and sync waveforms.

Description of The Preferred Embodiment

Figure 1:
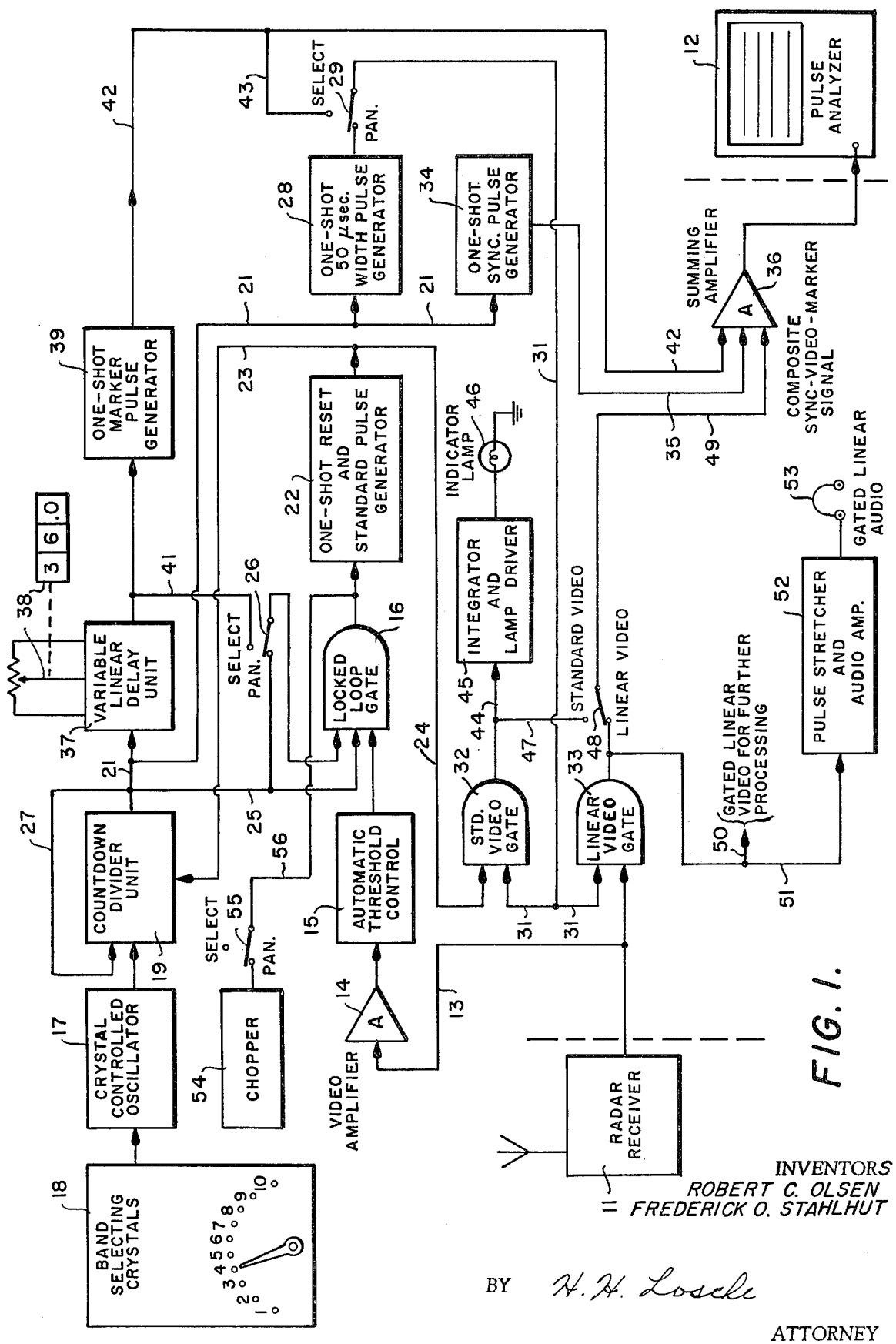
FIG. 1 represents a block-schematic diagram of the invention coupled between a suitable radar receiver and multi-gun visual pulse analyzer display means.

Referring more particularly to FIG. 1, there is shown, in block-schematic form, an embodiment of the invention as it would be utilized in conjunction with a conventional prior art radar receiver 11 and a conventional prior art multi-gun pulse analyzer 12. The output of radar receiver 11 is coupled, via conducting means 13, to a video amplifier 14 for amplifying the incoming signals. These amplified video signals from receiver 11 are applied to any suitable automatic threshold control means 15 which produces a standard width output pulse in response to each input video pulse above an adjustable threshold level. The output of automatic threshold control 15 is coupled as an input to a "locked loop" gating means 16, which forms a part of an automatic gating loop for separating the video pulses received from receiver 11 into discrete bands according to the time interval, or PRI, between successive pulses in the same pulse train. Gate 16 may be a suitable three-input AND gate.

This automatic gating loop also includes a highly accurate local time reference comprised of a crystal controlled oscillator 17, a multi-position crystal selector 18 including a set of band selecting crystals to enable the operator to manually select the operating frequency of oscillator 17 and thereby the desired PRI-PRF band, and a countdown binary divider unit 19 comprised of a group of electronic flip-flops coupled in a series chain. Crystal controlled oscillators have proven to be very stable time reference devices. However, the minimum stable frequency range of prior art oscillators of this type is too high to produce reference time intervals, or delays, in a range suitable for use in the automatic gating loop of this invention. Therefore, the output of a stable crystal controlled oscillator 17 is utilized as the input to a series of binary flip-flops forming countdown divider unit 19 in order to lower, or divide, the stable oscillator frequency, thereby causing the output level on a conductor 21 from the final flip-flop stage of the divider unit to change at a rate directly dependent upon, but much lower than, the oscillator frequency. Thus the reference time interval, or delay, between changes in the output level of countdown divider unit 19 will be governed by the operating frequency of oscillator 17 and the number of flip-flop stages coupled in series to make up divider unit 19. For example, a divider unit 19 comprised of eleven series-coupled binary flip-flop stages ($2^0$ through $2^{10}$) will divide any frequency produced by oscillator 17 by the number "1024" ($2^0$ through $2^{10}$ = 1024), so that by proper selection of the crystals for crystal holder 18 a relatively wide range of discrete PRI bands may be produced with a high degree of accuracy. The specific function of this accurate local time reference will become more clear as the disclosure proceeds. The output of gating means 16 is coupled to the input of a "one-shot", or monostable multivibrator, circuit 22 which produces an output pulse on conductors 23 and 24 in response to each pulse received at its input. Conductor 23 is coupled to flip-flop divider unit 19 as a reset line, and each pulse produced by one-shot circuit 22 resets all of the flip-flop stages of the divider unit to their "zero", or low level, state. The output level of divider unit 19 is coupled via a conductor 25 directly to the middle input terminal of three-input AND gate 16 and to the "panoramic" input terminal of a SPDT mode switch 26, whose output terminal is coupled to the remaining input of gate 16. A conductor 27 also couples the output level of divider unit 19 back to its own first stage, as a form of lock-out circuit to prevent constantly running oscillator 17 from driving divider 19 except during the countdown period. This "feedback" constantly maintains the first flip-flop stage at the "one", or high, level until a reset pulse from one-shot 22 causes the output of divider 19, taken from its final flip-flop stage, to drop to its "zero", or low, level allowing oscillator 17 to drive divider 19 and begin the countdown period.

Conductor 21 from divider 19 is coupled as an input to a one-shot gating pulse generator 28 to cause it to produce a single output pulse of 50 microseconds duration at the conclusion of each countdown by divider 19. The output of one-shot 28 is coupled to the "panoramic" input terminal of a SPDT mode switch 29 whose output terminal is coupled via a conductor 31 to the control input terminals of gating means 32 and 33.

Conductor 21 is also coupled as an input to a one-shot synchronizing pulse generator 34 which produces a single output pulse, having a duration of less than 1 microsecond, at the conclusion of each countdown by divider 19. This "sync" pulse is coupled via a conductor 35 to an input terminal of a summing amplifier 36, whose output terminal is coupled to the input means of pulse analyzer 12.

Conductor 21 further couples the output of divider 19 to the input of a variable linear delay unit 37 having a calibrated control dial 38 for positioning by an operator to obtain any desired delay from zero to 50 microseconds. The output of delay unit 37 is a bi-level, or binary, signal which stands at the "one", or high, level at all times until triggered by the completion of a countdown by divider 19, at which time the output from delay 37 drops to the "zero" level for the delay period selected by dial 38 (between 0 and 50 μs), and then returns to the "one" level. The output of delay 37 is coupled directly to a one-shot marker pulse generator 39, and via conductor 41 to the "select" input terminal of mode switch 26 for coupling as an input to gate 16 when switch 26 is in the "select" mode. The inputs to gate 16 via conductor 25 and switch 26 maintain gate 16 blocked, or nonconducting, during the countdown period of divider unit 19 when switch 26 is in the "panoramic" position, and during the countdown period plus the additional variable delay introduced by delay unit 37 when switch 26 is in the "select" position. When the output of variable delay 37 returns from the "zero" to the "one" level, it triggers one-shot marker pulse generator 39, which produces a marker pulse of approximately three microseconds duration. This marker pulse from one-shot 39 is coupled, via a conductor 42, directly to summing amplifier 36 as a component of the composite sync-videomarker signal to be supplied by amplifier 36 to analyzer 12, and via a conductor 43 to the "select" input terminal of mode switch 29. When switch 29 is placed in the "select" position, the marker pulse is coupled, via conductor 31, as an "enabling" or gating pulse to standard and linear video gates 32 and 33 respectively, in place of the 50 $\mu$s enabling pulse from one-shot 28. The resetstandard video pulse produced by one-shot 22 is coupled via conductor 24 as an input to "standard video" gate 32 which, when held open by an enabling signal on conductor 31, permits the standard video pulse to pass therethrough. This standard video pulse is coupled via a conductor 44 to the input of an integrator and signal lamp driver circuit 45 for lighting a signal indicator lamp 46. If a sufficient number of standard video pulses are passed by gate 32 within a preselected time as determined by adjustment of integrator 45, for example, 400 pulses per second, lamp 46 will be lighted, indicating at least one solid pulse train is present in the selected PRI band. The standard video pulse from gate 32 is also coupled, via a conductor 47, to the "standard video" input terminal of an SPDT switch 48 whose output terminal is coupled via a conductor 49 to an input of summing amplifier 36 to provide the "video" component of the composite sync-video-marker signal to be supplied by the summing amplifier to analyzer 12. The linear, or "raw", video signal received by the invention from receiver 11 and present on conductor 13 is also coupled as an input to gate 33 which permits this raw video pulse signal from receiver 11 to pass directly to the "linear video" input terminal of switch 48 so long as gate 33 is held open by an enabling signal on conductor 31. This raw gated video from the output of gate 33 is also coupled to a terminal 50 for further processing by associated equipment if desired, and via a conductor 51 to the input of a pulse stretcher and audio amplifier circuit 52 whose output is coupled to a pair of headphones 53, for providing audio monitoring of the gated raw video signal by the operator.

A free running multivibrator of "chopper" 54, operating at a frequency lower than the lowest PRF to be measured by the invention, is coupled to the "panoramic" input terminal of an SPDT switch 55 whose output terminal is coupled via a conductor 56 to the input of one-shot 22. Thus, so long as switch 55 is in the "panoramic" position, the output of chopper 54 is coupled directly to the input of one-shot reset pulse generator 22, causing it to generate a reset pulse at the chopper frequency, independent of input pulses from gate 16, in order to prevent the automatic gating loop from being captured by a solid pulse train having the highest PRF within the selected PRI-PRF band. These independently generated reset pulses force the automatic gating loop to jump from one input pulse train to another on a time shared basis if more than one is present within the selected PRI-PRF band. This automatic time sharing produced by chopper 54, when the invention is placed in the "panoramic" mode, enables the operator to view all of the pulse trains within a selected PRI-PRF band, at one time in a panoramic display on the 50 $\mu$s trace of analyzer 12. The "storage" effect produced by the phosphors of the cathode ray tube of analyzer 12 combined with the retention effect of the human eye conceal the fact that time sharing is occurring. If any of these incoming pulse trains includes "jitter", this characteristic becomes immediately apparent, and can be precisely measured.

Mode switches 26, 29, and 55 may be combined in a single, triple pole-double throw switch means for simplicity in placing the invention in either of its two modes of operation, i.e., panoramic or select. Each of the component blocks of FIG. 1 may be comprised of a circuit or device well known and understood by those skilled in the art, and it is the combination of these well known components which comprises the invention.

As previously indicated, the PRI-PRF bands are determined by the frequency of oscillation of oscillator 17 and the number of flip-flop units coupled in series to make up countdown divider 19. In one embodiment of the invention which was constructed and successfully tested, the divider unit was comprised of eleven series flip-flop units which produced division of the oscillator frequency by 1024 ($2^{10} = 1024$, for $2^0$ through $2^{10}$ flip-flops), and 10 crystals were chosen and placed in multiposition crystal selector 18 to produce the ten fixed countdown delays and corresponding PRI-PRF bands shown in the following TABLE I:

TABLE I

| Position of Selector 18 | Fixed Delay For Countdown Divider 19 | PRI Band (Fixed Delay + 50 $\mu$s) | PRF Band ($10^6$/PRI Band) |
| --- | --- | --- | --- |
| 1 | 350 $\mu$s. | 350 – 400 $\mu$s. | 2500 – 2857 pps. |
| 2 | 395 | 395 – 445 | 2247 – 2532 |
| 3 | 440 | 440 – 490 | 2040 – 2272 |
| 4 | 484 | 484 – 534 | 1872 – 2066 |
| 5 | 529 | 529 – 579 | 1727 – 1890 |
| 6 | 573 | 573 – 623 | 1605 – 1745 |
| 7 | 797 | 797 – 847 | 1180 – 1255 |
| 8 | 843 | 843 – 893 | 1120 – 1186 |
| 9 | 887 | 887 – 937 | 1067 – 1127 |
| 10 | 933 | 933 – 983 | 1017 – 1072 |

It is to be understood that the values shown in TABLE I are for purposes of information only and are not intended to limit the use of the invention to these bands. It will be obvious to one skilled in the art that by varying the number of crystals or their frequencies and/or the number of series flip-flops comprising divider unit 19, the invention may be constructed so as to provide suitable PRI-PRF bands for any required general or specific application. After the bands for a particular embodiment have been established, a conversion chart for each of the bands may be prepared to enable the operator to rapidly convert the reading of dial 38 directly into the PRF value for the unknown signal in that band. Such a chart could include the dial readings from 0 to 50 $\mu$s as the abscissas, and the resulting PRF in pulses per second would comprise the ordinates. The relationship is a linear one, and the charts may be readily prepared once the fixed delay for each band has been established.

Referring now to FIG. 2, a representation of the CRT face plate of a suitable multi-trace pulse analyzer 12 is shown. It depicts the form of display which would be produced with the invention operating in its "panoramic" mode, and the video signals from radar receiver 11 including two solid, pulse trains within the particular PRI-PRF band being monitored. The 50 μs trace most effectively shows the panoramic effect, and will display each of the pulse trains occurring within the band selected to be monitored, as well as the sync pulse and the movable marker pulse. The pulse trains are displayed in relative position according to their respective PRI-PRF values, with the lower PRI (higher PRF) pulses nearer the sync pulse, or left end of the display. The position of the marker pulse may be varied from "0" at the left end, to "50" μs at the right end of the 50 μs trace by moving the calibrated dial 38 on the variable linear delay unit 37 between its 0 and 50 μs readings. When operating in this panoramic mode, the PRI in microseconds for any of the displayed pulse trains may be determined by observing the 50 μs trace and adjusting dial 38 until the leading edge of the marker pulse is placed in coincidence with the leading edge of the selected pulse. The PRI of that pulse train is then obtained by reading the calibrated dial 38 of variable delay unit 37 (some value between 0 and 50 μs) and adding that reading to the known fixed delay in microseconds produced by countdown unit 19 when operating in the particular band selected on crystal selector 18. For example, if the crystal selector 18 is set at position 4 thereby selecting a crystal which is known to cause oscillator 17 to operate at a frequency such that divider 19 produces a fixed delay of 484 μs for each full countdown, and calibrated dial 38 reads 36.0 μs (as shown in FIG. 1) when the leading edge of the marker pulse is placed in coincidence with the leading edge of the video pulse, then the PRI of that particular pulse train would be 520 μs (484 μs fixed delay + 36.0 μs variable delay), and its PRF would be equal to $10^6$/PRI μs or 1,923 pulses per second ($10^6$/520 = 1,923 pps., to the nearest pulse).

With reference to FIG. 3, there is shown the form of display which would be produced on the CRT of analyzer 12 with the invention operating in its "select" mode. The select mode is provided to enable an operator to more closely examine a single video pulse train on both the 50 μs and expanded 5 μs scales without displaying other distracting pulse trains occurring within the selected band. This is accomplished by causing the marker pulse to also serve as the gating pulse for video gates 32 and 33 in the select mode, thereby blocking all video pulses to analyzer 12 except the one which coincides with the movable marker. Thus by moving the marker pulse, by adjustment of dial 38, until it coincides with the second pulse train, that pulse train is displayed on analyzer 12 and all other pulse trains within the selected band are blocked.

In both FIGS. 2 and 3 it has been assumed that switch 48 of FIG. 1 was placed in the linear or "raw" video position, and, accordingly, the video pulse trains are depicted as having irregular tops followed by stray signals or "grass". If the linear characteristics of the video pulse trains are unnecessary or undesirable, switch 48 may be placed in the "standard video" position and each of the pulse trains displayed will then be comprised of pulses of standard width and amplitude since they will be the standard reset pulses from one-shot 22.

Figure 4:
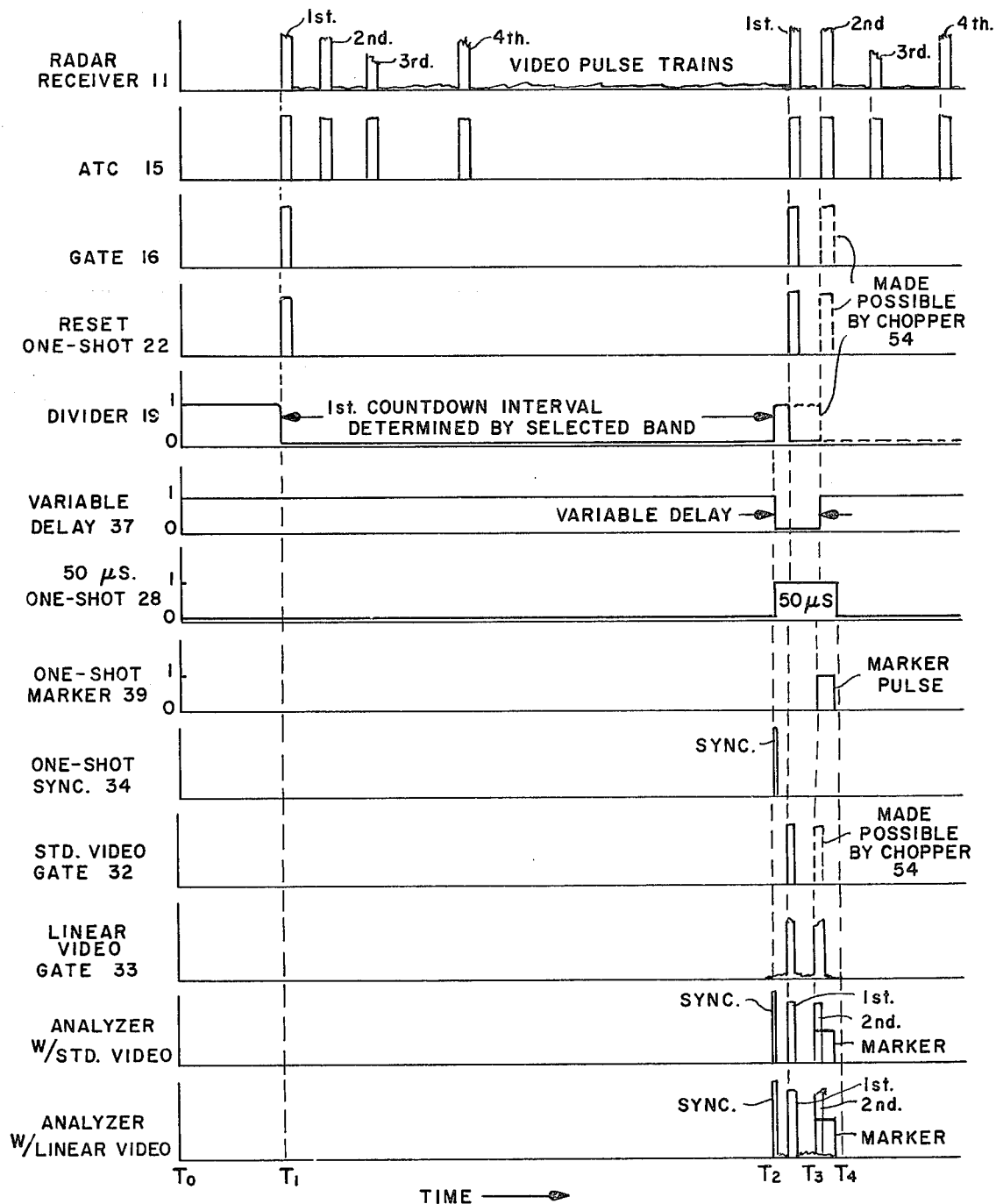
FIG. 4 represents a relative timing chart of various waveforms as they might appear at various points during the operation of the invention in the panoramic mode.

Referring now to FIG. 4, there is shown a timing chart depicting the output signals of various components of the invention and their relative relationships during operation in the panoramic mode. The timing chart will be discussed in detail in the following description of operation.

OPERATION

The operation of the embodiment of the invention shown in FIG. 1 occurs in the following manner. Initially, it will be assumed that a suitable pulse radar receiver 11 and multi-trace pulse analyzer display means 12 have been coupled to the respective input and output terminals of the invention, and that switch means 26, 29, and 55 have been placed in the "panoramic" position. The invention is now ready for operation in the panoramic mode. Switch 48 may be in either the linear or the standard video position, as selected by the operator. The video signals from receiver 11 are coupled via conductor 13 through video amplifier 14 to automatic threshold control (ATC) 15 which produces an output pulse of standard width and amplitude in response to each input video pulse above an adjustable threshold level. The waveforms labeled "radar receiver 11" in FIG. 4 are representative of the video pulse trains applied to the input of ATC 15, and the waveforms immediately below labeled "ATC 15", represent the standard output pulses therefrom. These standard pulses from ATC 15 are applied to "locked loop", three-input AND gate 16. In the panoramic mode, the other two inputs of gate 16 are coupled via conductor 15 to the output (final flip-flop stage) of divider 19 which rests in the "1" state until reset. This "1" state output of divider 19 is also coupled via conductor 27 to its own input (first flip-flop stage) to prevent the output of oscillator 17 from driving divider 19 until it is reset by one-shot 22. Therefore, when the first pulse from ATC 15 is applied to gate 16, all of its inputs will be at the "1" level and it will supply an output pulse to one-shot reset generator 22, causing one-shot 22 to produce a reset pulse on conductor 23 which immediately resets all flip-flops in divider 19 to their "0" states. This "unlocks" the first stage of divider 19, permitting it to be driven by oscillator 17 and immediately begin the countdown period, or fixed delay, at time $T_1$ of FIG. 4. The resetting of divider 19 also causes the inputs to gate 16 via conductor 25 to drop to the "0" level, "locking out" all video signals after the first pulse for the remainder of the countdown interval (except as modified by the action of chopper 54 which will be explained later).

At the conclusion of the countdown interval, i.e., when oscillator 17 has driven divider 19 sufficiently to again place a "1" in its final flip-flop stage (time $T_2$ of FIG. 4), the change in its output level from "0" to "1" produces the following results simultaneously: (1) oscillator 17 is again prevented from driving divider 19, (2) the "1" level is restored to the two inputs of gate 16 via conductor 25 and switch 26, removing it from the "locked out" condition, (3) one-shot sync pulse generator 34 is activated, via conductor 21, to produce a sync pulse which is coupled via conductor 35 and summing amplifier 36 to analyzer 12 causing it to sync all of its traces, (4) one-shot gating pulse generator 28 is activated, via conductor 21, and produces a gating pulse of 50 μs width which is coupled via switch 29 and conductor 31 as a "1" level enabling signal to each of the video gates 32 and 33, allowing these gates to pass to analyzer 12, through switch 48 and summing amplifier 36, any video signals applied to their other input terminals, via conductor 24 for standard video gate 32, and directly from receiver 11 for linear or "raw" video gate 33, during the 50 μs enabling signal, and (5) it activates variable linear delay unit 37 causing its output to drop from the "1" level to the "0" level and remain at the "0" level for an interval (from 0 to 50 μs) determined by the position of adjustable, calibrated dial 38. At the conclusion of this selected variable delay period (time $T_3$ of FIG. 4), the output of delay 37 returns to the "1" level, activating one-shot marker pulse generator 39 thereby producing a marker pulse on conductor 42, which is coupled via summing amplifier 36 for display on analyzer 12. At the end of the 50 μs gating pulse (time $T_4$ of FIG. 4) produced by one-shot 38, the output level on conductor 31 drops to "0" and gates 32 and 33 are blocked, or prevented from passing additional video pulses to analyzer 12. Thus, between times $T_2$ and $T_4$ of FIG. 4, the invention will provide at the output of summing amplifier 36 a composite sync-video-movable marker signal which will produce on a time shared basis a panoramic display on analyzer 12 of all of the video pulse trains within the selected band, of the type shown in FIG. 2.

The chopper 54, operating at a frequency lower than that of the lowest PRF band, automatically causes one-shot reset generator 22 to produce reset pulses at the rate of its operating frequency, independent of the reset pulses produced in response to the highest PRF video pulse train passing "locked loop" gate 16. These independently generated reset pulses force divider 19 to unlock gate 16 at different times allowing the "locked loop" to jump from one PRF train to another within the desired band, thereby preventing "capture" of the locked loop by the highest PRF pulse train (1st pulse train in FIG. 4), and producing equal time sharing among all of the unknown video pulse trains within one band. This time sharing of the locked loop, when combined with the "storage" effect produced by the phosphors of the CRT of analyzer 12 and the retention properties of the human eye, provide the operator with a panoramic view of all of the pulse trains within a selected PRI-PRF band. The procedure for determining the values of PRI and PRF of each of the video pulse trains displayed by positioning of the marker pulse has been previously explained with regard to TABLE I and FIG. 2.

When it becomes desirable in a particular application for the operator to more closely examine one of the video pulse trains on the expanded 5 μs trace of analyzer 12 without the distraction produced on that scale by other pulse trains present within the band when operating in the panoramic mode, he may place the marker pulse in coincidence with the pulse train to be more closely examined and then place switches 26, 29, and 55 in the "select" position. The invention will then be operating in the "select" mode, and the display on analyzer 12 will appear generally as shown in FIG. 3 with only the pulse train which coincides with the marker pulse being displayed.

By placing switch 55 in the "select" position, chopper 54 is removed from the circuit because time sharing is unnecessary when only one pulse train is to be displayed. When switch 26 is placed in the "select" position, one of the inputs to "locked loop" AND gate 16 is coupled to the output of variable delay unit 37 via conductor 41 to cause gate 16 to remain "locked" or blocking not only for the countdown, or fixed delay period, of divider unit 19 (as in the panoramic mode), but also for the additional variable delay period produced by delay unit 37. This prevents any pulse train which might happen to occur within the interval after the countdown and before the conclusion of the variable delay period, from "stealing" the locked loop away from the pulse train selected to be displayed. Placing switch 29 in the "select" position couples conductor 31 and the enabling inputs of video gates 32 and 33, via conductors 43 and 42, to the output of one-shot marker pulse generator 39, so that gates 32 and 33 are enabled by the 3 μs marker pulse rather than the 50 μs output signal from one-shot 28. Thus it may be seen that the only video pulses which will be allowed to pass through gates 32 and 33 when the invention is operating in the "select" mode will be those which coincide with the marker, or "selecting", pulse. These selected pulses will pass, via switch 48, conductor 49, and amplifier 36, to analyzer 12, producing a display of the type shown in FIG. 3. The PRI and PRF values for each of the selected signals may be determined in the same manner in the "select" mode as previously explained for the "panoramic" mode.

The embodiment of the invention which has been constructed and successfully tested has demonstrated an accuracy of 0.1% in determining PRI and PRF values of unknown video pulse trains in complex, multi-signal environments compared with an accuracy, at best, of ± 5.0% for known devices of the prior art. The invention provides the rapid acquisition, or "lock up", as early as the second or third pulse in most pulse trains, which is required when a rotating antenna is employed either by the receiver or the unknown transmitter.

Thus it may be seen, in view of the foregoing explanation and figures of drawing, that the invention, an electronic signal processing device for determining the pulse repetition interval and frequency of unknown radar signals in a multi-signal environment is a useful and necessary device having utility in the area of radar countermeasures and electronic intelligence gathering systems.

While many modifications may be made in this disclosed embodiment by replacing various elements and components with equivalent structures, it is to be understood that we desire to be limited in the spirit of our invention only by the scope of the appended claims.

We claim:

1. An electronic signal processing device for performing precise real time measurement of the pulse repetition interval and frequency of pulse radar signals in a multi-signal environment, comprising:
   input means for coupling to a radar receiver to receive said pulse radar signals therefrom;
   an automatic gating loop coupled to said input means, for receiving said pulse radar signals and separating said signals into discrete bands by pulse repetition interval and frequency;
   synchronizing pulse generating means having input means coupled to said automatic gating loop, for producing video synchronizing pulses at its output means in response to control signals from said automatic gating loop;

a first video gating means having first and second input means and an output means, said first input means thereof being coupled to said automatic gating loop for receiving standard video pulses therefrom for each video pulse train within a selected one of said discrete bands, and said second input means thereof being for receiving enabling signals to control the passage of said standard video pulses from said first input means thereof to said output means thereof;

a second video gating means having first and second input means and an output means, said first input means thereof being coupled to said input means for receiving said pulse radar signals from said radar receiver, and said second input means thereof being coupled in parallel with said second input means of said first gating means for receiving said enabling signals to control the passage of said pulse radar signals from said first input means thereof to said output means thereof;

video gating signal generating means having input means coupled in parallel with said input means of said synchronizing pulse generating means to said automatic gating loop for receiving said control signals therefrom, and having output means switchably coupled to said second input means of each of said first and second video gating means, for producing said enabling signals at said output means thereof in response to said control signals from said automatic gating loop;

adjustably linear delay means having input means coupled to said automatic gating loop for receiving said control signals therefrom, having manually adjustable control means for determining the length of delay to be introduced by said delay means between the receipt of said control signals and the production of corresponding output signals, and having output means for providing the delayed said corresponding output signals thereat;

marker pulse generating means having input means coupled to said output means of said adjustable linear delay means for receiving said delayed corresponding output signals therefrom and producing a marker pulse of relatively short duration in response to each such signal, and having output means for providing said marker pulses thereat, said output means thereof being switchably coupled to said second input means of each of said first and second video gating means for providing said marker pulses as enabling signals thereto; and summing amplifier means having a first input means coupled to said output means of said synchronizing pulse generating means for receiving said video synchronizing pulses therefrom, a second input means coupled to said output means of said marker pulse generating means for receiving said marker pulses therefrom, and a third input means switchably coupled to the respective output means of said first and second video gating means for alternatively receiving said standard video pulses from said first video gating means and said unknown pulse radar signals from said second video gating means, and having output means for providing thereat a composite signal comprised of said synchronizing pulses, said video pulses, and said marker pulses for coupling to a pulse analyzing display means.

2. An electronic signal processing device for performing precise real time measurement of the pulse repetition interval and frequency of pulse radar signals in a multi-signal environment as set forth in claim 1 wherein said input means for coupling to a radar receiver comprises:
a video amplifier for amplifying said pulse radar signals received from said radar receiver; and
an automatic threshold control means having input means coupled to said video amplifier for receiving the amplified said pulse radar signals therefrom and having output means for providing thereat a pulse of predetermined amplitude and width for each incoming pulse radar signal having an amplitude above a preset level.

3. An electronic signal processing device for performing precise real time measurement of the pulse repetition interval and frequency of pulse radar signals in a multi-signal environment as set forth in claim 1 wherein said automatic gating loop comprises:
a coincidence gating means having a plurality of inputs and an output, one of said inputs being coupled to said input means for coupling to a radar receiver to receive said pulse radar signals therefrom;
a timing reference means for providing selected fixed delays, including a countdown divider means driven by a stable oscillator means, the output of said divider means being coupled to at least one of said inputs of said coincidence gating means to cause said coincidence gating means to be maintained in a blocking condition throughout each of said selected fixed delays;
a standard pulse generating means having input means coupled to said output of said coincidence gating means for receiving coincidence signals therefrom, and having output means for providing thereat a pulse signal of predetermined width and amplitude in response to each of said coincidence signals received, said output means being coupled to said countdown divider means to initiate each of said fixed delays and to said first input means of said first video gating means for providing said standard video pulses thereto; and
an electronic chopper means switchably coupled to said input means of said standard pulse generating means for causing said standard pulse generating means to produce output pulses independent of said coincidence signals from said coincidence gating means.

4. An electronic signal processing device for performing precise real time measurement of the pulse repetition interval and frequency of pulse radar signals in a multi-signal environment as set forth in claim 1 wherein:
said synchronizing pulse generating means is comprised of a monostable multivibrator, for providing an output pulse of high amplitude and short duration;
said video gating signal generating means is comprised of a monostable multivibrator, for providing an output pulse of medium amplitude and long duration; and
said marker pulse generating means is comprised of a monostable multivibrator, for providing an output pulse of medium amplitude and short duration.

5. An electronic signal processing device for performing precise real time measurement of the pulse repetition interval and frequency of pulse radar signals in a multi-signal environment as set forth in claim 4 wherein said automatic gating loop comprises:
- a coincidence gating means having a plurality of inputs and an output, one of said inputs being coupled to said input means for coupling to a radar receiver to receive said pulse radar signals therefrom;
- a timing reference means for providing selected fixed delays, including a countdown divider means driven by a stable oscillator means, the output of said divider means being coupled to at least one of said inputs of said coincidence gating means to cause said coincidence gating means to be maintained in a blocking condition throughout each of said selected fixed delays;
- a standard pulse generating means having input means coupled to said output of said coincidence gating means for receiving coincidence signals therefrom, and having output means for providing thereat a pulse signal of predetermined width and amplitude in response to each of said coincidence signals received, said output means being coupled to said countdown divider means to initiate each of said fixed delays and to said first input means of said first video gating means for providing said standard video pulses thereto; and
- an electronic chopper means switchably coupled to said input means of said standard pulse generating means for causing said standard pulse generating means to produce output pulses independent of said coincidence signals from said coincidence gating means.

* * * * *